Patented Dec. 18, 1934

1,985,045

UNITED STATES PATENT OFFICE 1,985,045

MANUFACTURE OF GOODS OF OR CONTAINING RUBBER OR SIMILAR MATERIAL

Evelyn William Madge, Erdington, and Albert Nelson Ward, Bordesley Green, England, assignors to Dunlop Rubber Company Limited, Birmingham, England, a British corporation No Drawing. Application December 28, 1932, Serial No. 649,150. In Great Britain January 29, 1932

5 Claims. (Cl. 18—53)

This invention comprises improvements in or relating to the manufacture of goods of or containing rubber or similar material by one or more operations such as moulding, spreading, spraying or dipping, particularly on metallic or like surfaces from aqueous emulsions or dispersions of the kinds hereinafter specified.

The present invention is particularly concerned with the production of porous or micro-porous articles of vulcanized rubber or the like from aqueous emulsions or dispersions of the kinds hereinafter specified which are coagulated or gelled in any one or more operations such as moulding, spreading, spraying or dipping, and the products so obtained are thereafter vulcanized in known manner under such conditions that evaporation of the liquid contained in the pores or micro-pores of the aforesaid products is prevented.

The object of the present invention is to produce by any one or more of the aforesaid operations improved porous or micro-porous articles of vulcanized rubber or the like, in particular battery separators or filtering diaphragms or cones easily removable from a backing surface or mould, which are substantially free from surface markings.

The particular surface markings which are to be removed according to the present invention are those which show depressions on one side of a micro-porous article and on the other side of the article the exact contour of these depressions in relief.

According to the present invention the process for the manufacture of improved porous or micro-porous articles of vulcanized rubber or the like from aqueous emulsions or dispersions of the kinds hereinafter specified wherein the emulsions or dispersions aforesaid are coagulated or gelled in any one or more operations such as moulding, spreading, spraying, or dipping, and thereafter vulcanizing in known manner, the product so obtained, under such conditions that evaporation of the product is prevented, comprises treating the backing or mould surfaces, particularly metallic or the like surfaces with metallic soaps such as zinc, cadmium or ferric salts of the higher fatty acids, particularly zinc stearate.

The metallic soaps gently promote gelling at the surface of the latex in contact with the backing or mould surfaces and, due to their lubricating action, any gas formed and collected between the metal plate and the surface of the latex is uniformly distributed and not localized.

Sharp markings are in this way prevented. On the other hand known lubricants such as sodium silicate have been found useless in connection with the production of micro-porous articles of vulcanized rubber as the gelling of the latex mixing at the surface of the mould plate is affected, sticking and a bad surface resulting. Further certain metallic soaps such as zinc soaps are also useful in removing sulphuretted hydrogen evolved on the surface of the rubber adjacent the backing or mould surface.

We have found that oily or greasy metallic soaps do not give satisfactory micro-porous vulcanized rubber products. For instance if the backing or mould surfaces are treated with an oily liquid soap such as ferric oleate products are obtained free from the undesirable characteristic marking but there is however apparent a streakiness probably due to bad wetting of the oily surface.

We have also found that manganese oleate, calcium oleate, cobalt stearate and lead oleate are all unsatisfactory as these soaps lead to very bad sticking to the backing or mould surfaces of the micro-porous vulcanized rubber products.

The metallic soaps such as zinc stearate are preferably applied either by spraying or wiping to the backing or mould surface as a very thin layer in the form of an aqueous dispersion or preferably dispersed in methylated spirits.

The advantages of using dispersions of soaps in methylated spirits are that dispersion takes place readily due to the wetting power of the methylated spirits and also methylated spirits evaporate rapidly leaving a thin film of the lubricant on the surface of the mould.

The backing or mould plate is preferably warmed to hasten the formation of the thin film of the dry dispersion of the metallic soap.

The emulsions or dispersions of rubber or the like comprise those consisting of or containing rubber, gutta percha, balata or similar vegetable resins occurring naturally or artificially obtained.

Such artificial dispersions may include those of coagulated rubber, vulcanized rubber, synthetic rubber, waste or reclaim. If desired any of the aforementioned dispersions may be used alone or in admixture with one another.

Any of the aforesaid dispersions may contain the usual known compounding ingredients and/or may be in concentrated form.

Concentrates such as are obtained in Patent No. 1,846,146 of February 23, 1932, to which may be added any one or more of the usual compounding ingredients may also be used.

The present invention has been found particularly useful in connection with the processes described and claimed in Patent No. 1,819,647 and in applications Ser. No. 513,783 filed February 5, 1932, and No. 599,070 filed March 15, 1932.

Having now particularly described and ascertained the nature of our said invention and in what manner the same is to be performed, we declare that what we claim is:—

1. A process for the manufacture of porous or micro-porous articles of vulcanized rubber material from aqueous dispersions thereof, which comprises treating a backing or mould surface with a soap formed of a metal of the group consisting of zinc, cadmium and iron and solid fatty acids, placing the dispersion in contact with said surface, gelling said dispersions and vulcanizing the gell of dispersion under such conditions as to prevent evaporation of the liquid in the gelled dispersion.

2. A process as claimed in claim 1 wherein zinc stearate is employed.

3. A process as claimed in claim 1 wherein the metallic soaps are applied to the backing or moulding surface as a very thin layer.

4. A process as claimed in claim 1 wherein the metallic soaps are applied to the backing or moulding surface in the form of a dispersion in methylated spirits.

5. A process for the manufacture of porous or micro-porous articles of vulcanized rubber material from aqueous dispersions thereof, which comprises coating a moulding surface with a stearate of a metal of the group consisting of zinc, cadmium and iron, forming a body of dispersion in contact with such surface, gelling said dispersion and vulcanizing while preventing the evaporation of water therefrom.

EVELYN WILLIAM MADGE.
ALBERT NELSON WARD.